Figure 1:
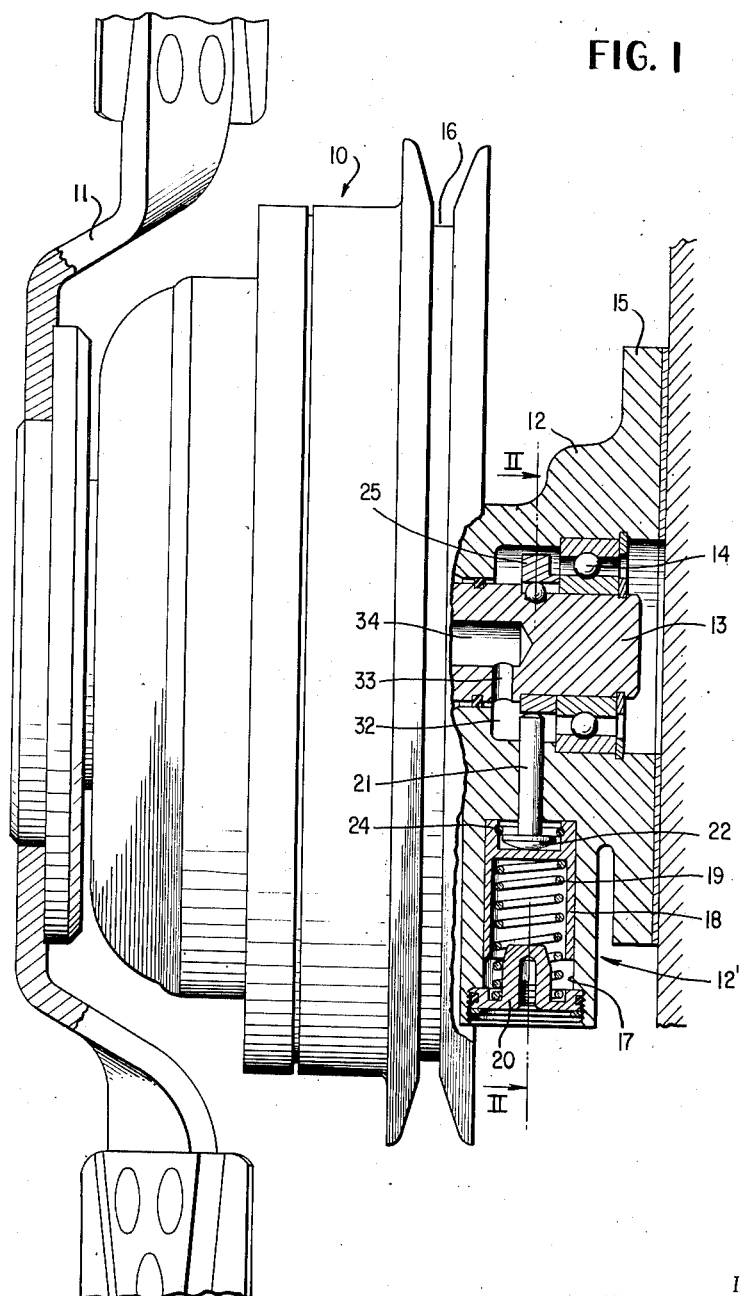

Oct. 12, 1965   M. H. BURCKHARDT ETAL   3,211,136
FAN DRIVE FOR VEHICLES
Filed Jan. 31, 1962   2 Sheets-Sheet 1

INVENTORS.
MANFRED H. BURCKHARDT
OTTO RÖDER
BY
Dicke and Craig
ATTORNEYS.

Oct. 12, 1965   M. H. BURCKHARDT ETAL   3,211,136
FAN DRIVE FOR VEHICLES
Filed Jan. 31, 1962   2 Sheets-Sheet 2

INVENTORS.
MANFRED H. BURCKHARDT
OTTO RÖDER
BY
Dicke and Craig
ATTORNEYS.

United States Patent Office 3,211,136
Patented Oct. 12, 1965

3,211,136
FAN DRIVE FOR VEHICLES
Manfred H. Burckhardt, Waiblingen, and Otto Röder, Fellbach, Kreis Waiblingen, Germany, assignors to Daimler-Benz Aktiengesellschaft, Stuttgart-Unterturkheim, Germany
Filed Jan. 31, 1962, Ser. No. 170,124
Claims priority, application Germany, Feb. 4, 1961, D 35,345
13 Claims. (Cl. 123—41.12)

The present invention relates to an installation for coupling a fan to an internal combustion engine in vehicles, especially truck-type vehicles, with the aid of a hydrodynamic coupling through which flows a coupling liquid.

Installations of the aforementioned type are known per se in the prior art. In these prior art installations, the circulatory system for the hydrodynamic fan coupling has been connected with the lubricating circulatory system of the internal combustion engine. This entails, inter alia, the disadvantage that the seals of the fan coupling are subjected to the relatively high pressure of the lubricating system. Any flow or leakage in the fan coupling or the seals thereof thereby also impairs and disables the lubrication which may have far-reaching consequences. Additionally, there arose difficulties when, for purposes of control or regulation of the fan coupling, a constant supply pressure had been necessitated which can be attained with the usual lubricating oil pumps only at relatively high rotational speeds.

The present invention aims at the elimination of the aforementioned disadvantages. The present invention thereby starts with the concept of an independent circulatory system proper for the fan itself, and proposes therefor to separate the circulatory system of the coupling liquid for the hydrodynamic fan coupling from other circulatory systems, for example, from the lubricating circulatory system of the internal combustion engine and to so arrange and construct the hydrodynamic fan coupling for purposes of supplying the coupling liquid that it is provided with a pump driven by the drive of the hydrodynamic coupling and structurally united therewith.

The installation according to the present invention offers the advantage that the different circulatory systems can no longer mutually influence or disturb each other. The seals of the hydrodynamic fan coupling have to be designed and selected only for the pressure prevailing within the coupling circulatory system that is practically completely constant. It has been noted particularly in the operation of trucks, that within the questionable rotational speed range the conventional lubricating pumps cannot maintain sufficiently constant this pressure.

According to the present invention, the pump serving for purposes of supplying the coupling liquid is for that purpose constructed as a piston pump supplying a constant pressure and the supply quantity thereof is controlled by a valve or the like which is arranged on the suction side of the pump. This valve can be controlled in any appropriate manner, known in the prior art, in dependence on the temperature of the cooling medium. The entire pump may also consist, of course, of several individual pump units which are mutually displaced with respect to the pressure phases thereof and are provided with common suction and pressure spaces even though the construction with only a single cylinder is normally completely satisfactory.

Hydrodynamic fan couplings are known already in the prior art in which the driving part is supported by means of a shaft within a stationary axle stub. According to the present invention, with such fan couplings the axle stub forms a housing part and thereby simultaneously accommodates the pump or pump units which is or are, respectively, driven by means of an eccentric on the shaft of the fan coupling. One pump cylinder for each pump unit is thereby arranged at right angle to the coupling shaft within the housing formed by the stationary axle stub which pump cylinder accommodates a unilaterally acting pump piston which, in turn, abuts with a tappet thereof against an eccentric ring secured to the coupling shaft.

The construction of the pump piston according to the present invention takes the form of the known plunger-type piston. On the one hand, the tappet for the actuation by the coupling shaft is coordinated to the plunger piston only during the suction stroke. On the other hand, a spring acts on the plunger piston which effectuates the pressure stroke. The spring may thereby be adjustable so that different pressures may be selectively achieved. The pump piston is arranged with the part therof accommodating the tappet within the working space of the pump which is closed off in a manner known per se by means of a conventional suction and pressure valve. It is both advantageous and important for proper operation of the pump that the space disposed on the piston rear side be also in constant communication with the supply of the coupling liquid disposed ahead of the suction valve but behind the control valve.

Accordingly, it is an object of the present invention to provide a hydrodynamic coupling for the drive of a fan in motor vehicles, particularly in trucks, which eliminates the disadvantages and short-comings encountered with the prior art arrangements.

It is another object of the present invention to provide a coupling installation utilizing a hydrodynamic coupling for drivingly connecting the fan of an internal combustion engine with the drive shaft of the fan in which the circulatory system of the hydrodynamic coupling is completely separate and independent from any other circulatory system so as to prevent unduly heavy pressure loads on the seals that might damage the same when excessive pressures prevail in the tie-in system.

Another object of the present invention resides in the provision of a fan coupling utilizing a hydrodynamic coupling in which the circulatory system for the hydrodynamic coupling is completely separate from such other circulatory system as the engine lubricating system so as to minimize the possibility of damages that may occur to the engine in case of leakage losses or flow losses within the fan coupling circulatory system.

A further object of the present invention resides in the provision of a hydrodynamic fan coupling in which an essentially constant supply pressure may be readily maintained over a relatively wide speed range of the rotational speeds in which the driving shaft of the hydrodynamic coupling operates.

Still another object of the present invention resides in the provision of a hydrodynamic fan coupling of the type mentioned hereinabove provided with its own circulatory system for the coupling liquid which also provides a simple, reliable and yet inexpensive pump unit that may be readily combined with the fan drive in such a manner as to minimize the space requirements thereof.

A further object of the present invention resides in the provision of a circulatory system for the hydrodynamic coupling of a fan drive in internal combustion engines in which the pressure stroke and therewith the output pressure may be readily adjusted by simple spring adjustments.

Figure 2:
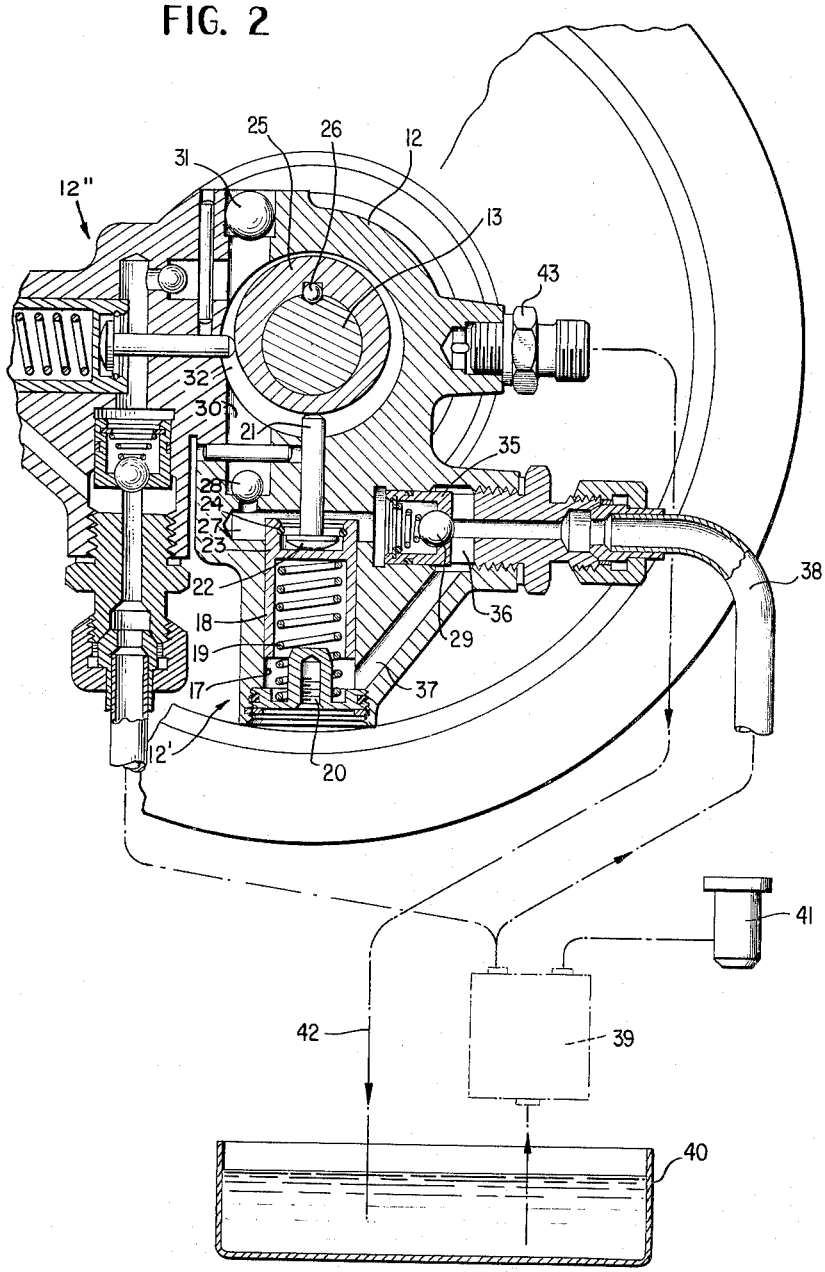

These and other objects, features and advantages of the present invention will become more obvious from the following description when taken in connection with the accompanying drawing which shows, for purposes of illustration only, one embodiment in accordance with the present invention, and wherein FIGURE 1 is a partial longitudinal cross sectional view through an installation in accordance with the present invention, and FIGURE 2 is a cross sectional view taken along line II—II of FIGURE 1.

Referring now to the drawing wherein like reference numerals are used throughout the two views to designate like parts, reference numeral 10 generally designates therein the hydrodynamic coupling which is operatively connected with the fan 11 of any conventional construction so as to rotate in unison therewith. A stationary or fixed axle stud 12 serves for purposes of accommodating the hydrodynamic coupling. A shaft 13 is supported within the stationary axle stub 12 by means of bearings 14 and carries, in a manner known per se, the fan coupling (not illustrated). The internal construction of the coupling 10 may also be of conventional known design and is not shown in detail herein since it forms no part of the present invention. The stationary axle stub 12 is secured with the flange 15 thereof at the housing of the internal combustion engine B or at any other appropriate vehicle part. The drive of the fan coupling takes place by means of the V-belt pulley 16 constituted by the outer coupling housing.

The stationary axle stub forms additionally, as may be readily recognized in FIGURE 2, a housing generally designated in this figure by reference numeral 12′ and 12″ for the pump units. In the present case, a pair of pump units are provided. However, it is also understood that only a single pump unit or more than a pair of pump units for example, three pump units may be provided which are arranged at a corresponding angular displacement. Since each of the pump units 12′ and 12″ is identical in operation and construction, a specific description of unit 12′ only will be necessary to a clear understanding of the entire combination. It should therefore be quite clear that all descriptions of unit 12′ are equally applicable to the corresponding elements of unit 12″. A cylinder 17 is provided within the housing 12′ which cylinder 17 is disposed at right angle to the shaft 13 and accommodates therein the pump piston 18. The pump piston 18 is constructed as a conventional plunger piston. A spring 19 is disposed on the inside of the plunger piston 18. The spring 19 is supported at the cover 20 as abutment. The cover 20 may be suitably secured within the housing 12′ in an adjustable manner by any conventional means to enable adjustment of the pump pressure.

The actuation of the pump piston 18 takes place by means of a tappet 21 which abuts with a mushroom-shaped extension 22 against the bottom of the plunger piston 18. The plunger piston bottom has an upwardly extending rim 23. A snap ring 24 or a similar securing means in this rim 23 prevents the tappet 21 from lifting itself off the plunger piston bottom while at the same time providing for the tappet 21 a certain freedom of movement with respect to the piston bottom. An eccentric ring 25 is secured on the shaft 13 for the actuation of the tappet 21 and is secured against relative rotation with respect to the shaft 13 by means of a ball 26 or in a similar manner.

The upper part of the plunger piston 18 accommodating the tappet 21 is disposed within the working space 27 of the pump which is closed off by means of a pressure valve 28 and a suction valve 29. A bore 30 which is closed off against the outside, for example, by a pressed-in ball 31 leads from the pressure valve 28 into the space 32 from which a cross bore 33 (FIGURE 1) within shaft 30 leads to the longitudinal bore 34 which then supplies the coupling liquid to the fan coupling.

The suction valve 29 is disposed within a separate insert 35. The supply space 36 of the pump disposed ahead of the suction valve 29 is operatively connected through a bore 37 with the space on the rear side of the plunger piston 18. A connecting line 38 leads from supply space 36 through a control valve 39 to the tank 40 for the coupling liquid which tank may also possibly be the lubricating oil tank or sump. The valve 39 is controlled, in any known conventional manner, by means of a thermostat 41 in dependence on the cooling water temperature or a medium proportional to the engine temperature. The return of the coupling liquid takes place through a line 42 which also leads back from a connecting nipple 43 into the tank 40.

*Operation*

The operation of the fan coupling in accordance with the present invention is as follows:

As soon as the shaft 13 rotates, the tappet 21 together with the pump piston 18 is displaced downwardly by the eccentric 25 during each rotation thereof and thereby draws in coupling-liquid from the supply 36 into the working space 27 by opening suction valve 29. Upon further rotation of the shaft 13, the spring 19 forces the drawn in coupling-liquid from working space 27 through the pressure valve 28 into bore 30. The pressure is determined exclusively by the spring force and may be maintained constant in this manner. Simultaneously there is drawn-in, from the supply 36 and through line 38, a further amount of coupling liquid during a pressure stroke of the piston 18 by the rear side thereof which further amount can thereupon enter during the next suction stroke immediately again through the suction valve 29 into the working space 27 of the pump.

The regulation of the supply quantity takes place by means of valve 39 in any conventional manner. If, for example, the valve 39 is adjusted to a relatively small flow cross section, then only this quantity which flows therethrough is supplied and the entire stroke of the pump piston 18 is only utilized to this proportionate extent as only relatively little liquid can continue to flow through the line 38. It is only with the complete opening of the valve 39 that also the entire piston stroke of the pump becomes effective, this means in other words, with the supply of smaller quantities of liquid, the tappet 21 lifts off the eccentric ring 25 in proportion to the decreasing piston stroke.

While we have shown and described one embodiment in accordance with the present invention, it is understood that the same is not limited thereto, but is susceptible of many changes and modifications within the spirit and scope thereof, and we therefore do not wish to be limited to the details shown and described herein, but intend to cover all such changes and modifications as are encompassed by the scope of the appended claims.

We claim:

1. In an installation for coupling a fan to an internal combustion engine in vehicles having an engine cooling system, especially in trucks, including a hydrodynamic coupling provided with drive means and through which flows a coupling liquid, the improvement consisting essentially of a circulatory system for the coupling liquid of said hydrodynamic coupling, the fluid pressure in said circulatory system being independent from the fluid pressure in said engine cooling system and including pump means for supplying said coupling liquid to said coupling, said pump means being driven by the drive means of the hydrodynamic coupling and being united structurally therewith.

2. In an installation for coupling a fan to an internal combustion engine in vehicles, especially in trucks, including a hydrodynamic coupling provided with drive means and through which flows a coupling liquid, the improvement consisting essentially of a circulatory system for the coupling liquid of said hydrodynamic coupling, said circulatory system being separate from any other circulatory system and including pump means in said system for supplying said coupling liquid to said coupling, sump means for said coupling liquid, first conduit means on the suction side of said pump means for supplying said coupling liquid to said pump means, and second conduit means for returning said coupling liquid from said hydrodynamic coupling to said sump means, said pump means being driven by the drive means of the hydrodynamic coupling and being united structurally therewith, said pump means being constructed as a piston-pump supplying a constant pressure of coupling liquid, and valve means disposed in said first conduit means on the suction side of said pump means for controlling the quantity of liquid supplied thereby.

3. An installation as defined in claim 2, further including control means operatively connected with said valve means for controlling said valve means in dependence on the temperature of the engine.

4. In an installation for coupling a fan to an internal combustion engine in vehicles, especially in trucks, including a hydrodynamic coupling provided with drive means and through which flows a coupling liquid, the improvement consisting essentially of a circulatory system for the coupling liquid of said hydrodynamic coupling, said circulatory system being separate from any other circulatory system and including pump means in said system for supplying said coupling liquid to said hydrodynamic coupling, said pump means consisting of several piston-pump units having a common pressure and suction space and each having a pressure stroke and a suction stroke, each said pump unit being driven by the drive means of the hydrodynamic coupling through the pressure and suction strokes thereof with the pressure strokes of the individual pump units being out of phase with respect to each other, said pump means being united structurally with said hydrodynamic coupling.

5. In an installation for coupling a fan to an internal combustion engine in vehicles, especially in trucks, including a hydrodynamic coupling provided with drive means and through which flows a coupling liquid, the improvement consisting essentially of a circulatory system for the coupling liquid of said hydrodynamic coupling, said circulatory system being separate from any other circulatory system and including pump means in said system for supplying said coupling liquid to said coupling, sump means for said coupling liquid, first conduit means for supplying said coupling liquid to said pump means from the sump means, and second conduit means for returning said coupling liquid from said hydrodynamic coupling to said sump means, said pump means comprising several piston-pump units each supplying a constant pressure of coupling liquid, said pump unit having a common pressure and suction space and being driven through a pressure stroke and a suction stroke by the drive means of the hydrodynamic coupling, each said pump unit being united structurally therewith, and valve means disposed in said first conduit means on the suction side of said pump means for controlling the quantity of liquid supplied thereby, and control means operatively connected with said valve means for controlling said valve means in dependence on the temperature of the engine.

6. In an installation for coupling a fan to an internal combustion engine in vehicles, especially in trucks, comprising a hydrodynamic coupling provided with driving means including a shaft element, and a coupling liquid flowing through said hydrodynamic coupling, the improvement consisting essentially of a relatively fixed axle stub means for supporting said drive means by means of said shaft element, a circulatory system for the coupling liquid of said hydrodynamic coupling, said circulatory system being separate from any other circulatory system and comprising pump means structurally united with said hydrodynamic coupling for supplying said coupling liquid, said pump means being accommodated within a housing part of said axle stub means, said pump means including at least one piston pump unit supplying a substantially constant pressure of coupling liquid and comprising a cylinder arranged within said housing part substantially at right angles to said shaft element, a unilaterally acting piston in said cylinder and drive means for said pump means including an eccentric on said shaft element and a tappet operatively connecting said piston with said eccentric to reciprocate the piston.

7. In an installation for coupling a fan to an internal combustion engine in vehicles, especially in trucks, comprising a hydrodynamic coupling provided with driving means including a shaft element, and a coupling liquid flowing through said hydrodynamic coupling, the improvement consisting essentially of a relatively fixed axle stub means for supporting said drive means by means of said shaft element, a circulatory system for the coupling liquid of said hydrodynamic coupling, said circulatory system being separate from any other circulatory system and including pump means structurally united with said hydrodynamic coupling for supplying said coupling liquid, said pump means being accommodated with a housing part of said axle stub means, said pump means including at least one piston pump unit having a suction stroke and a pressure stroke for supplying a substantially constant pressure of coupling liquid, said pump-unit including a cylinder arranged within said housing part substantially at right angles to said shaft element, a unilaterally acting piston in said cylinder and drive means for said pump means including an eccentric on said shaft element and a tappet operatively connecting said piston with said eccentric to reciprocate the piston, said tappet being positively connected with said piston only for the suction stroke of said pump-unit, and spring means for providing the pressure stroke of said pump-unit operatively associated with said piston in such a manner that said tappet is non-positively connected with said eccentric during the pressure stroke.

8. In an installation for coupling a fan to an internal combustion engine in vehicles, especially in trucks, comprising a hydrodynamic coupling provided with driving means including a shaft element, and a coupling liquid flowing through said hydrodynamic coupling, the improvement consisting essentially of a relatively fixed axle stub means for supporting said drive means by means of said shaft element, a circulatory system for the coupling liquid of said hydrodynamic coupling, said circulatory system being separate from any other circulatory system and including pump means structurally united with said hydrodynamic coupling for supplying said coupling liquid, said pump means being accommodated within a housing part of said axle stub means, said pump means including at least one piston pump unit having a suction stroke and a pressure stroke for supplying a substantially constant pressure of coupling liquid, said pump-unit including a cylinder arranged within said housing part substantially at right angles to said shaft element, a unilaterally acting piston in said cylinder and drive means for said pump means including an eccentric on said shaft element and a tappet operatively connecting said piston with said eccentric to reciprocate the piston, said tappet being positively connected with said piston only for the suction stroke of said pump-unit, and spring means provided for the pressure stroke of said pump-unit operatively associated with said piston in such a manner that said tappet is non-positively connected with said eccentric during the pressure stroke, said piston being constructed as plunger piston accommodating on the inside thereof said spring means, and cover means for the cylinder simultaneously serving as abutment for said spring means.

9. An installation for coupling a fan to an internal combustion engine as defined in claim 8, wherein said cover means is adjustable so as to allow adjustability of the abutment for said spring means to selectively adjust the output pressure of said pump means.

10. In an installation for coupling a fan to an internal combustion engine in vehicles, especially in trucks, comprising a hydrodynamic coupling provided with driving means including a shaft element, and a coupling liquid flowing through said hydrodynamic coupling, the improvement consisting essentially of a relatively fixed axle stub means for supporting said drive means by means of said shaft element, a circulatory system for the coupling liquid of said hydrodynamic coupling, said circulatory system being separate from any other circulatory system and including pump means structurally united with said hydrodynamic coupling for supplying said coupling liquid, said pump means being accommodated with a housing part of said axle stub means, said pump means including at least one piston pump unit having a suction stroke and a pressure stroke for supplying a substantially constant pressure of coupling liquid, said pump-unit including a cylinder arranged within said housing part substantially at right angles to said shaft element, a unilaterally acting piston in said cylinder and drive means for said pump means including an eccentric on said shaft element and a tappet operatively connecting said piston with said eccentric to reciprocate the piston, said tappet being positively connected with said piston only for the suction stroke of said pump-unit, and spring means for providing the pressure stroke of said pump-unit operatively associated with said piston in such a manner that said tappet is non-positively connected with said eccentric during the pressure stroke, said tappet being provided at the end thereof opposite said spring means with a mushroom-like head portion inserted into an extended rim portion of said piston.

11. In an installation for coupling a fan to an internal combustion engine in vehicles, especially in trucks, comprising a hydrodynamic coupling provided with driving means including a shaft element, and a coupling liquid flowing through said hydrodynamic coupling, the improvement consisting essentially of relatively fixed axle stub means for supporting said drive means by means of said shaft element, a circulatory system for the coupling liquid of said hydrodynamic coupling, said circulatory system being separate from any other circulatory system and including pump means in said system structurally united with said hydrodynamic coupling for supplying said coupling liquid, said pump means being accommodated within a housing part of said axle stub means, said pump means including at least one piston pump unit having a suction stroke and a pressure stroke for suppling a substantially constant pressure of coupling liquid, said pump-unit including a cylinder arranged within said housing part substantially at right angles to said shaft element, a unilaterally acting piston in said cylinder and drive means for said pump means including an eccentric on said shaft element and a tappet operatively connecting said piston with said eccentric to reciprocate the piston, said tappet being positively connected with said piston only for the suction stroke of said pump-unit, and spring means for providing the pressure stroke of said pump-unit operatively associated with said piston in such a manner that said tappet is non-positively connected with said eccentric during the pressure stroke, said piston being constructed as plunger piston accommodating on the inside thereof said spring means, and cover means for the cylinder simultaneously serving as an abutment for said spring means, the piston being disposed with the part thereof receiving said tappet in the working space of said pump means, and pressure and suction valve means for closing off said working space.

12. In an installation for coupling a fan to an internal combustion engine in vehicles, especially in trucks, comprising a hydrodynamic coupling provided with driving means including a shaft element, and a coupling liquid flowing through said hydrodynamic coupling, the improvement consisting essentially of relatively fixed axle stub means for supporting said drive means by means of said shaft element, a circulatory system for the coupling liquid of said hydrodynamic coupling, said circulatory system being separate from any other circulatory system and including pump means in said system structurally united with said hydrodynamic coupling for supplying said coupling liquid, said pump means being accommodated within a housing part of said axle stub means, said pump means including at least one piston pump unit having a suction stroke and a pressure stroke for supplying a substantially constant pressure of coupling liquid, said pump-unit including a cylinder arranged within said housing part substantially at right angles to said shaft element, a unilaterally acting piston in said cylinder and drive means for said pump means including an eccentric on said shaft element and a tappet operatively connecting said piston with said eccentric to reciprocate the piston, said tappet being positively connected with said piston only for the suction stroke of said pump-unit, and spring means for providing the pressure stroke of said pump-unit operatively associated with said piston in such a manner that said tappet is non-positively connected with said eccentric during the pressure stroke, said piston being constructed as plunger piston accommodating on the inside thereof said spring means, and adjustable cover means for the cylinder simultaneously serving as an abutment for said spring means to selectively adjust the output pressure of said pump means, said tappet being provided at the end thereof opposite said spring means with a mushroom-like head portion inserted into an extended rim portion of said piston, the piston being disposed with the part thereof receiving said tappet in the working space of said pump means, and pressure and suction valve means for closing off said working space, the interior space of said plunger piston accommodating said spring means being in constant communication with the supply of said pump means in front of said suction valve means.

13. In an installation for coupling a fan to an internal combustion engine in vehicles, especially in trucks, comprising a hydrodynamic coupling provided with driving means including a shaft element, and a coupling liquid flowing through said hydrodynamic coupling, the improvement consisting essentially of relatively fixed axle stub means for supporting said drive means by means of said shaft element, a circulatory system for the coupling liquid of said hydrodynamic coupling, said circulatory system being separate from any other circulatory system and including pump means in said system structurally united with said hydrodynamic coupling for supplying said coupling liquid, said pump means being accommodated within a housing part of said axle stub means, said pump means including at least one piston pump unit having a suction stroke and a pressure stroke for supplying a substantially constant pressure of coupling liquid, said pump-unit including a cylinder arranged within said housing part substantially at right angles to said shaft element, a unilaterally acting piston in said cylinder, valve means disposed on the suction side of said pump means for controlling the quantity of liquid supplied thereby, control means for regulating said valve means in dependence on the engine temperature, and drive means for said pump means including an eccentric on said shaft element and a tappet operatively connecting said piston with said eccentric to reciprocate the piston, said tappet being positively connected with said piston only for the suction stroke of said pump-unit, and spring means for providing the pressure stroke of said pump-unit operatively associated with said piston in such a manner that said tappet is non-positively connected with said eccentric during the pressure stroke, said piston being constructed as plunger piston accommodating on the inside thereof said spring means, and adjustable cover means for the cylinder simultaneously serving as an abutment for said spring means to selectively adjust the output pressure of said pump means, said tappet being provided at the end thereof opposite said spring means with a mushroom-like head portion inserted into an extended rim portion of said piston, the piston being disposed with the part thereof receiving said tappet in the working space of said pump means, and pressure and suction valve means for closing off said working space, the interior space of said plunger piston accommodating said spring means being in constant communication with the supply of said pump means in front of said suction valve means.

References Cited by the Examiner

UNITED STATES PATENTS

| 2,153,372 | 4/39 | Hyde | 192—85 |
| 2,406,486 | 8/46 | Bonham | 123—41.12 |
| 2,777,287 | 1/57 | Tweedale | 236—35 |

FOREIGN PATENTS

| 1,096,623 | 2/55 | France. |

RICHARD B. WILKINSON, *Primary Examiner.*